(12) United States Patent
Huber

(10) Patent No.: US 7,898,101 B1
(45) Date of Patent: Mar. 1, 2011

(54) GAS TURBINE ENGINE WITH SYNTHETIC GAS FUEL

(75) Inventor: David J. Huber, Tequestra, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 610 days.

(21) Appl. No.: 11/998,369

(22) Filed: Nov. 29, 2007

Related U.S. Application Data

(60) Provisional application No. 60/872,361, filed on Dec. 1, 2006.

(51) Int. Cl.
*F01D 15/10* (2006.01)
*H02K 7/18* (2006.01)

(52) U.S. Cl. .............................................. 290/52; 290/2

(58) Field of Classification Search .................... 290/52, 290/60, 2
See application file for complete search history.

(56) References Cited

U.S. PATENT DOCUMENTS

| 6,107,693 | A | * | 8/2000 | Mongia et al. ................. 290/52 |
| 6,906,432 | B2 | * | 6/2005 | Belokon et al. ................ 290/52 |
| 7,078,825 | B2 | * | 7/2006 | Ebrahim et al. ............... 290/52 |
| 7,299,638 | B2 | * | 11/2007 | MacKay ........................ 60/784 |
| 7,584,599 | B2 | * | 9/2009 | Benz et al. .................... 60/39.17 |
| 2008/0104939 | A1 | * | 5/2008 | Hoffmann et al. ............. 60/39.5 |
| 2010/0170263 | A1 | * | 7/2010 | Steele et al. ................... 60/781 |

* cited by examiner

*Primary Examiner* — Michael C Zarroli
(74) *Attorney, Agent, or Firm* — John Ryznic

(57) ABSTRACT

A gas turbine engine used to produce electric power is supplied with a fuel from a alcohol fuel producing process. A high pressure syngas left over from the alcohol fuel producing process is passed through a small turbine to drive an electric generator and produce electric power. The low pressure syngas from the turbine is then passed into a combustor of the gas turbine engine to power the gas turbine, which drive a larger electric generator to produce more electric power. The high pressure syngas can be passed through a heat exchanger to preheat the syngas prior to be burned within the combustor. By using the small turbine to reduce the pressure of the high pressure syngas, energy from the high pressure syngas can be extracted instead of wasted.

9 Claims, 3 Drawing Sheets

GAS TURBINE ENGINE WITH SYNTHETIC GAS FUEL

CROSS-REFERENCE TO RELATED APPLICATIONS

This application claims the benefit to a U.S. Provisional Patent Application 60/872,361 filed Dec. 1, 2006 by David J. Huber and entitled GAS TURBINE ENGINE WITH SYTHETIC GAS FUEL.

BACKGROUND OF THE INVENTION

1. Field of the Invention

The present invention relates generally to a power plant, and more specifically to a synthetic gas (syngas) fueled power plant.

2. Description of the Related Art Including Information Disclosed Under 37 CFR 1.97 and 1.98

A power plant used to produce electric power uses an industrial gas turbine engine (IGT) to drive an electric generator. The combustor burns natural gas to produce the hot gas flow that is passed through the turbine to drive the rotor shaft. An IGT is a very efficient power plant to convert chemical energy from burning a fuel into mechanical energy through a turbine to drive a rotor shaft.

Coal is presently used to power a power plant. Coal is an abundant and cheap source of energy. However, coal is considered a dirty fuel because of the toxic chemicals present and the $CO_2$ and $NO_2$ products left over from the combustion. Synthetic gas (or syngas) is made from coal or biomass and burned as a fuel in a gas turbine engine to produce power. The syngas is clean energy and therefore would produce electric power without leaving the contaminated exhaust as is found in burning raw coal. Ethanol and methanol is produced from syngas in a catalytic reaction under very high pressure (e.g. 1,200 psia). The high pressure gas exiting the Fischer/Tropsch process is brought down in pressure low enough to be used in the combustion chamber of the IGT. Lowering the pressure of the syngas is typically done through a pressure reduction valve, and therefore the energy contained in the high pressure gas is wasted. In production of the syngas that is used to produce the ethanol or methanol, about 5% of the syngas is bled off and used to power the gas turbine engine. The gas turbine engine produces electric power used to produce the ethanol or methanol from the 95% syngas.

The production of alcohol fuels, such as ethanol or methanol, is from a biomass where the biomass is passed through a gasifier and air, oxygen or steam (or a combination of these three ingredients) is used to produce a relatively low pressure syngas. The low pressure syngas is cooled and then raised to a relatively high pressure of around 1,200 psia. This high pressure syngas is then passed into the Fischer/Tropsch reactor to produce the alcohol fuel. Around 95% of the high pressure syngas is converted into the alcohol fuel in the Fischer/Tropsch reactor while the remaining 5% of the syngas is left over from the reaction.

BRIEF SUMMARY OF THE INVENTION

It is an object of the present invention to provide for a syngas power plant with improved efficiency.

It is another object of the present invention to produce extra power from the high pressure syngas used as fuel in an IGT.

DETAILED DESCRIPTION OF THE INVENTION

The present invention is a small gas turbine engine, such as an industrial gas turbine (IGT) engine, that is used to drive an external device such as an electric generator. The IGT burns a synthetic gas. A high pressure (e.g. 1,200 psia) synthetic gas (or syngas) fuel supply is used and allows for an increased thermal efficiency. Instead of wasting the energy available in the very high pressure syngas, the high pressure syngas is passed through a turbine to reduce the syngas pressure to a level suitable for burning in the combustor while the turbine is used to drive a smaller electric generator and produce additional electric power. The high pressure syngas is the leftover syngas (the remaining 5% from the Fischer/Tropsch process described above) is used to power the gas turbine engine and drive the small turbine and electric generator associated with the small turbine. Several embodiments of the present invention are disclosed below for burning a high pressure syngas in the gas turbine engine. Small gas turbine engines are being used to provide power to drive small devices now that the cost of fuel has increased significantly. Because gas turbine engines are very efficient converters of chemical energy to mechanical energy, small gas turbines are being used more to replace small internal combustion engines that are less efficient.

Figure 1:
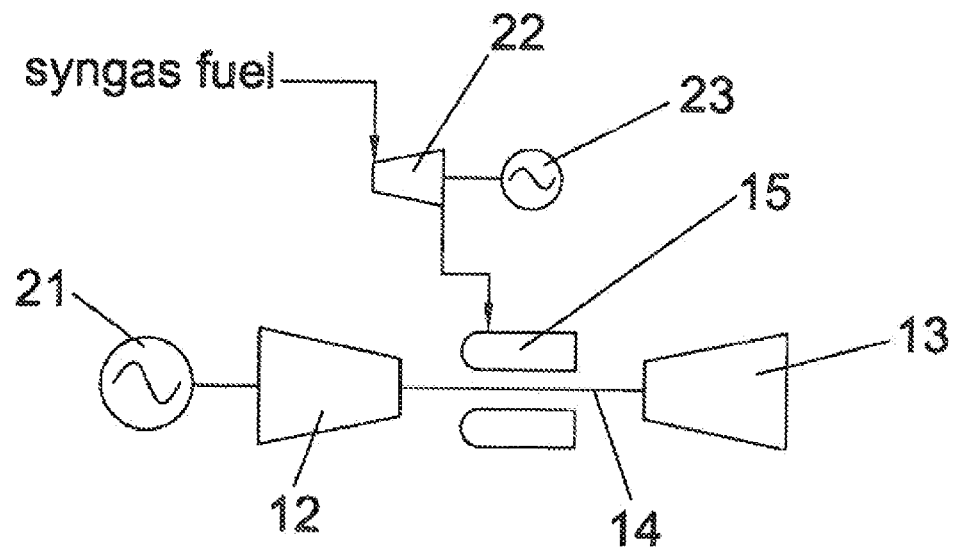
FIG. 1 shows a first embodiment of the syngas powered gas turbine engine of the present invention.

The first embodiment is shown in FIG. 1, and includes a compressor 12 and a turbine 13 connected to a common rotational shaft 14, and a combustor assembly 15 positioned between the compressor 12 and the turbine 13 to burn the syngas fuel and create the hot gas flow that is passed through the turbine 13. The combustor 15 can be an annular combustor or a number of can combustors mounted in an annular array. An electric generator 21 is rotatably connected to the rotor shaft 14 and is driven by the gas turbine engine to produce electric power. The electric generator 21 can be connected to the rotor shaft 14 through the compressor 12 as shown in FIG. 1, or through the turbine 13. In the first embodiment, a high pressure fuel turbine 22 is used to extract energy from the high pressure syngas fuel supply to drive a smaller electrical generator 23 before the syngas is injected into the combustor 15 to be burned with compressed air from the compressor 12. This arrangement provides for a direct expansion of the fuel to nominal fuel pressure for supply to the combustor. The exit pressure from the Fischer/Tropsch reactor is typically around 1,200 psia. Passing the high pressure syngas through the pressure reduction turbine 22 extracts the energy from the high pressure syngas but also reduces the syngas pressure to a level suitable for burning in the combustor 15. Thus, the present invention increases the efficiency of the power plant by not wasting the energy available in the high pressure syngas.

Figure 2:
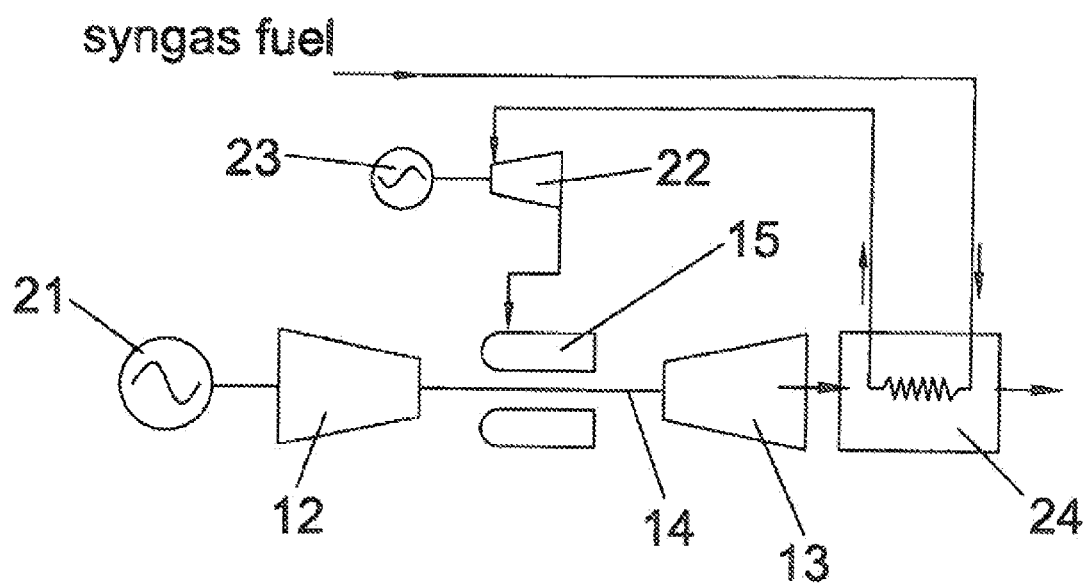
FIG. 2 shows a second embodiment of the syngas powered gas turbine engine of the present invention.

A second embodiment of the present invention is shown in FIG. 2. A high pressure syngas fuel is passed through a gas turbine exhaust heat exchanger 24 located in the turbine exhaust downstream from the turbine 14. The high pressure syngas is passed through the heat exchanger 24 to pick up heat from the turbine exhaust, and is then directed into the small fuel turbine 22 to drive the smaller electric generator 23. The syngas exhausted from the fuel turbine is then passed into the combustor 15. In this arrangement, the fuel is preheated and expanded to a nominal fuel pressure before discharged into the combustor 15.

Figure 3:
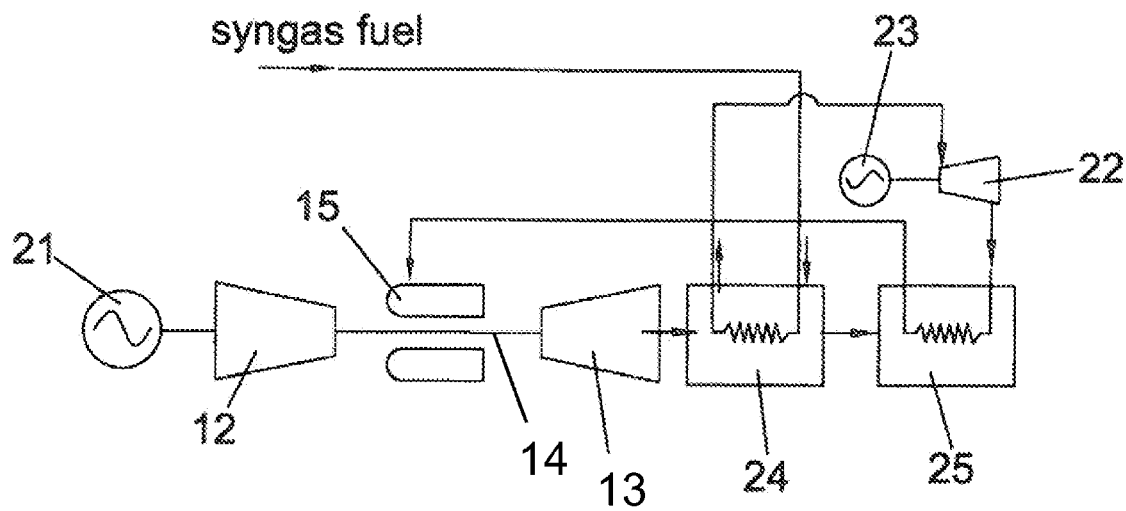
FIG. 3 shows a third embodiment of the syngas powered gas turbine engine of the present invention.

A third embodiment of the present invention is shown in FIG. 3. The high pressure syngas is passed through a first heat exchanger 24, into a smaller fuel turbine 22 to drive the smaller electric generator 23, and then into a second heat exchanger 25 before being discharged into the combustor 15. The second heat exchanger 25 is connected into the turbine exhaust path downstream from the first heat exchanger 24. In this arrangement, the fuel is preheated, and then expanded (pressure is lowered) to nominal fuel pressure, and then reheated.

Figure 4:
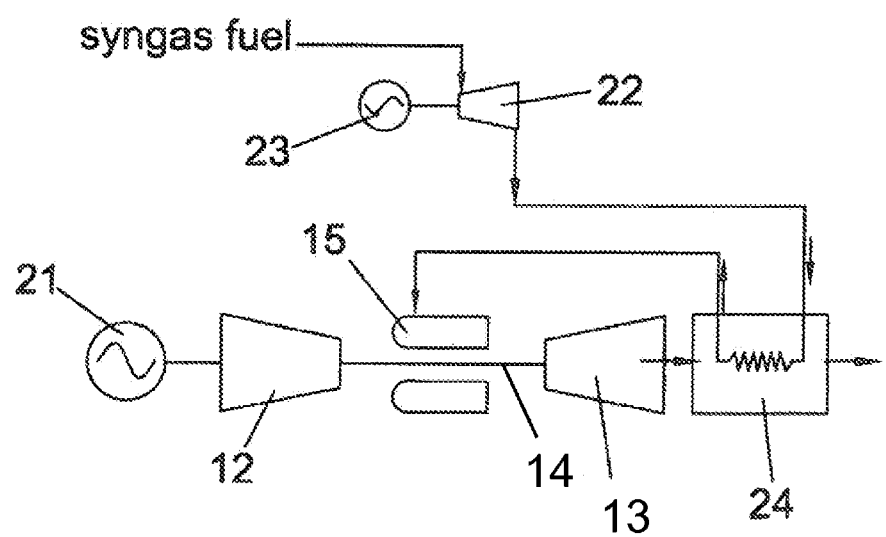
FIG. 4 shows a fourth embodiment of the syngas powered gas turbine engine of the present invention.

In a fourth embodiment of the present invention, shown in FIG. 4, the high pressure syngas is passed through a small fuel turbine 22 to expand the fuel (decrease pressure by extracting energy) and drive the small electric generator 23, and then passed into a heat exchanger 24 located in the turbine exhaust gas path to heat the fuel before discharging the fuel into the combustor 15. This is a direct expansion of the fuel to nominal fuel pressure (hot supply) and a reheat of the fuel.

Figure 5:
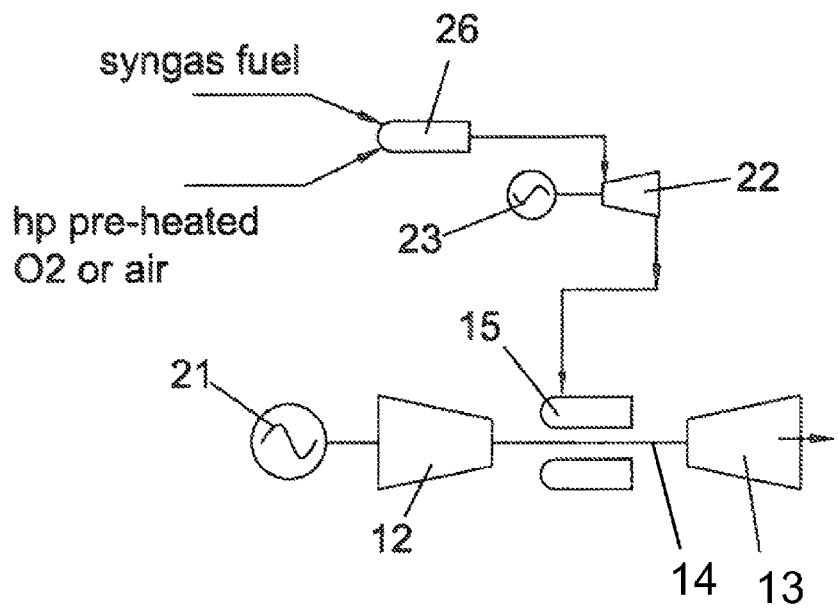
FIG. 5 shows a fifth embodiment of the syngas powered gas turbine engine of the present invention.

In a fifth embodiment of the present invention shown in FIG. 5, the high pressure syngas fuel is partially burned in a partial oxidation combustor 26 with oxygen or air to provide a high pressure pre-heat of the fuel. The pre-heated high pressure fuel is then directed through a smaller fuel turbine 22 to drive the smaller electric generator 23 and then into the combustor 15. This is a partial oxidation and expansion of the fuel. The oxygen or air is under a high pressure as well as the syngas fuel that is directed into the partial oxidation combustor.

Figure 6:
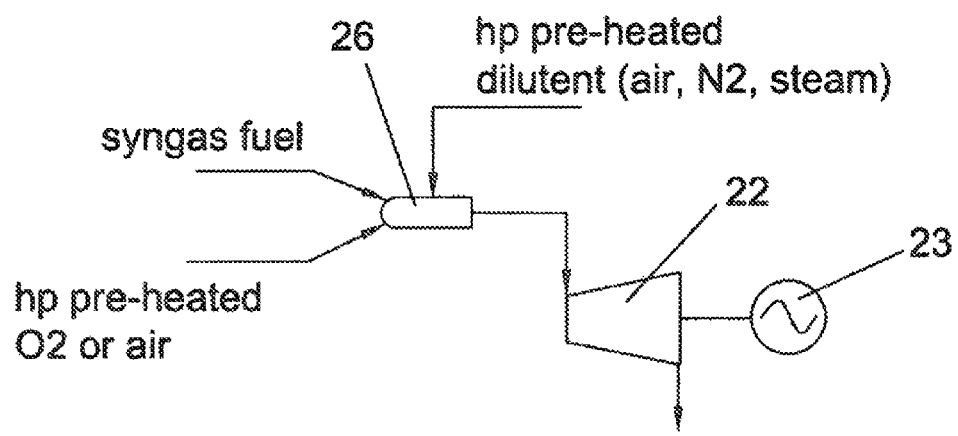
FIG. 6 shows a sixth embodiment of the syngas powered gas turbine engine of the present invention.

A sixth embodiment of the present invention is shown in FIG. 6, and includes the syngas fuel and partial oxidation combustor 26 of FIG. 5, but with the addition of a dilutent such as air, N2, or steam being added to the partial oxidation combustor 26. The dilutent is a high pressure and pre-heated dilutent. The mixture passed through the partial oxidation combustor 26 is then passed through the smaller fuel turbine 22 to drive the small electric generator 23 before being directed into the combustor 15 of the gas turbine engine as shown in the FIG. 5 embodiment. This application uses a high pressure and pre-heated syngas fuel, oxidant, and a dilutent to create a simple power generating expander.

I claim the following:

1. An electric power plant comprising:
    a gas turbine engine having a compressor, a combustor and a turbine;
    an electric generator rotatably connected to the gas turbine engine to produce electric power;
    a small turbine rotatably connected to a second electric generator to produce electric power;
    the gas turbine engine being powered by syngas burning in the combustor;
    the syngas being supplied to the combustor from a high pressure source of such a high pressure unsuitable for burning in a combustor of a gas turbine engine; and,
    the high pressure syngas being passed through the small turbine to reduce the pressure to a level suitable for burning in the combustor.

2. The electric power plant of claim 1, and further comprising:
    a heat exchanger operatively connected to the turbine to pass the turbine exhaust through, the high pressure syngas being passed through the heat exchanger prior to passing through the small turbine, the heat exchanger transferring heat from the turbine exhaust into the high pressure syngas.

3. The electric power plant of claim 2, and further comprising:
    a second heat exchanger operatively connected to the turbine to pass the turbine exhaust through, the second heat exchanger receiving the turbine exhaust from the first heat exchanger, and the low pressure syngas passing from the small turbine and through the second heat exchanger to preheat the low pressure syngas, and the low pressure preheated syngas then passing into the combustor.

4. The electric power plant of claim 1, and further comprising:
    a heat exchanger operatively connected to the turbine to pass the turbine exhaust through, the low pressure syngas being passed from the small turbine and then through the heat exchanger to preheat the low pressure syngas, and then the low pressure preheated syngas is passed into the combustor.

5. The electric power plant of claim 1, and further comprising:
    a partial oxidation combustor with an inlet for the high pressure syngas and an inlet for an oxidizer, the partial oxidation combustor preheating the high pressure syngas; and,
    the outlet of the partial oxidation combustor being connected to the inlet of the small turbine such that the preheated high pressure syngas is passed through the small turbine.

6. The electric power plant of claim 5, and further comprising:
    the partial oxidation combustor includes a third inlet to supply a dilutent to the combustor.

7. The electric power plant of claim 6, and further comprising:
    the dilutent is a high pressure dilutent.

8. The electric power plant of claim 7, and further comprising:
    the dilutent is also a preheated dilutent.

9. The electric power plant of claim 8, and further comprising:
    the dilutent is one or more of air, N2 or steam, or a combination of these.

* * * * *